Jan. 7, 1930.  P. ARTIGUE  1,742,680
METHOD OF MAKING MOTION PICTURES
Filed Nov. 12, 1925   2 Sheets-Sheet 1
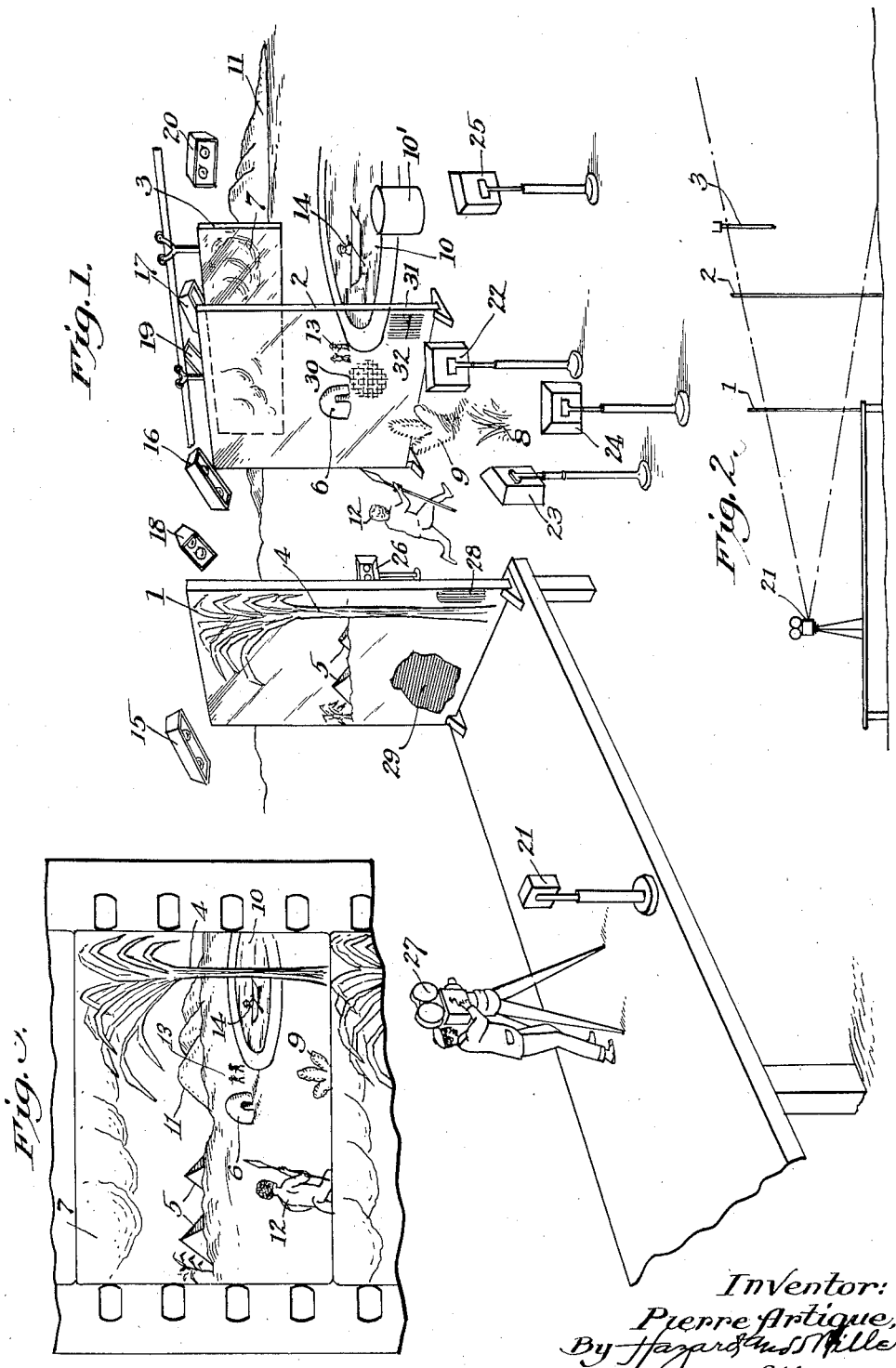
Inventor:
Pierre Artigue,
By Hazard and Miller
Attorneys Jan. 7, 1930.　　　　P. ARTIGUE　　　　1,742,680
METHOD OF MAKING MOTION PICTURES
Filed Nov. 12, 1925　　2 Sheets-Sheet 2
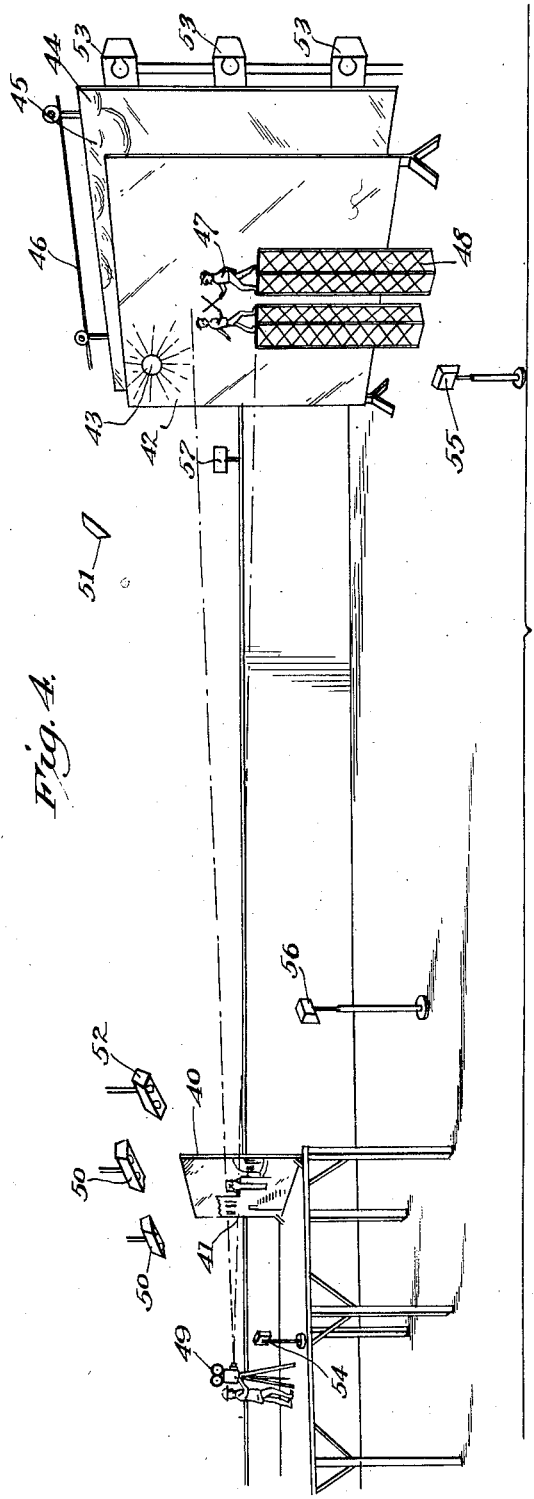
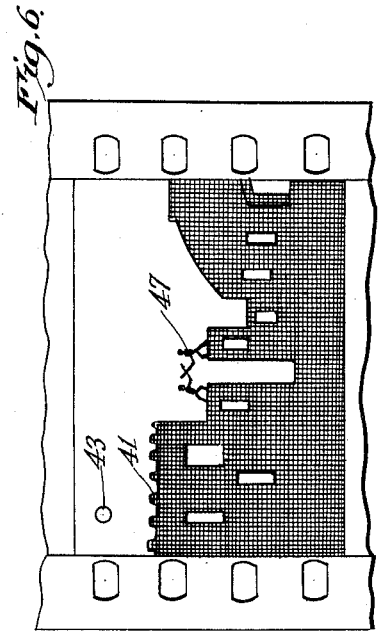
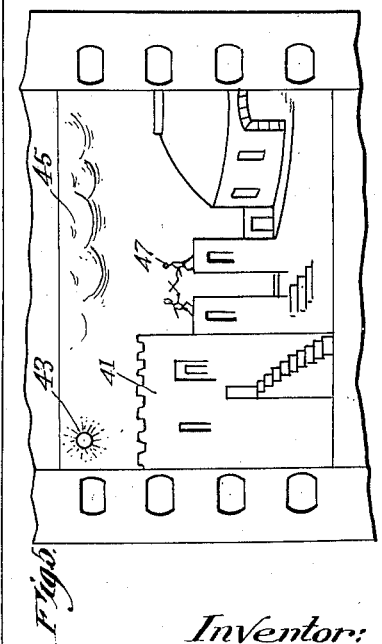
Inventor:
Pierre Artigue,
By Hazard and Miller
Attorneys Patented Jan. 7, 1930

1,742,680

UNITED STATES PATENT OFFICE

PIERRE ARTIGUE, OF LOS ANGELES, CALIFORNIA

METHOD OF MAKING MOTION PICTURES

Application filed November 12, 1925. Serial No. 68,682.

My invention is a method of making motion pictures and in the appliances, sets of screens, etc., used therein.

My invention comprises a number of cooperative features which on being utilized together form the setting and action for motion pictures and permit photographing, utilizing color effects best adapted to give the results desired from the standpoint of naturalness of the scene, setting and acting, the artistic value and to enhance or derogate objectionable portions of the scenery or to change the appearance of the actors or of the scenes.

One of the objects of my invention is to utilize transparent, semi-transparent or translucent screens on which a portion of the scene may be painted and to position these screens one behind the other, incorporating either natural or artificial settings between the screens and carrying on the action in front of, between or behind the different screens. Some of these screens may be movably mounted relative to the others so as to give the idea of relative motion such as that of clouds.

The screens may also be utilized to form light filters thereon by staining portions of the screen with a light filtering medium such as various dye stains to give a photographic color value as desired, or to eliminate features by utilizing a photographically negative light filter.

Another feature of my invention is to utilize colored lights which may be thrown on the screens illuminating different parts of the painted scenery, on the settings or on the actors. These color effects can be designed to harmonize the various portions of the whole makeup of the set and also to change the photographic actinic value of certain parts of the set.

Another feature of my invention is to change the lighting so that objects may appear in silhouette or partial silhouette and partial illumination or total front view illumination.

Another feature is the utilization of lights which will cause the objects illuminated to be either photographically more or less actinic as by throwing a red light illuminating an object or person so that they will not photograph or photograph indistinctly, this being a photographically less actinic color. Again the object or actor may be illuminated with a brilliant blue or yellow, giving a photographically more actinic color. The light may be designated for photographic purposes as being more actinic or less actinic.

Another object of my invention is to utilize the photographically less actinic and photographically more actinic colors illuminating an object, an actor or a painted scene, to make a rapid transposition from the photographically less actinic, blocking out the object, to a photographically more actinic, showing such object. In connection with this latter feature or independent thereof I may coat certain parts of the screens with light filters which will have the effect of giving a transposition from a photographically more actinic to a photographically less actinic color or vice versa; thus showing or eliminating portions of the setting. It is well understood that the ordinary photographic plate or film is affected differently by different colors, this being due to the chemical or so-called actinic value of such colors. Full panchromatic emulsions are rarely used on films for moving picture purposes and even such emulsions do not respond fully to all colors. It will therefore be readily understood that by changing the color scheme of a setting including the actors or of any particular portion of the set or particular actor, that the photographic effect may be materially changed.

In practicing my invention, I preferably set up a plurality of transparent screens or translucent screens in proper relation to natural and artificial objects, both in the foreground and background. On these screens are preferably painted scenery giving both the foreground and background and leaving portions of the screen unpainted. Artificial staging will be introduced either before, between or behind such screens and the actors may carry on the animated act either before, between or behind the screens.

Various color reflectors are utilized to give the color tones desired and to cause the functioning of photographically less or more actinic colors as desired.

When a scene is properly focused in the camera, light filters are coated on the screens to give a photographic color value as desired to the object or actor, showing through such filter stains. These stains may be manipulated in various graduations from photographically less actinic stains of sufficient body to eliminate an object or actor behind them or to the photographically more actinic to bring out in clear detail the object or actor photographed through such light filter.

My invention will be more readily understood from the following description and drawings, in which:

Figure 1 is a perspective view, illustrating the makeup of a setting, showing several transparent or translucent screens with painted scenery thereon, natural and artificial settings between and behind the screens and the action carried on between and behind the screens. The figure illustrates diagrammatically the throwing of various lights to give the effect above mentioned and the utilization of light filter stains on the screens.

Fig. 2 is a diagrammatic, longitudinal section illustrating the different screens, their relation to each other and to the camera.

Fig. 3 illustrates a section of a motion picture film indicating a positive made from the photograph taken of the set of Fig. 1.

Fig. 4 is a perspective view, showing my invention, and the use of screens and front and back lighting used for different effects.

Fig. 5 indicates a section of the motion picture positive film from the photograph of Fig. 4, indicating the effect with front lighting.

Fig. 6 is a view similar to Fig. 5, showing the silhouette of back lighting.

Reference will first be directed to the setting of Figs. 1 and 2. In this case a plurality of screens 1, 2 and 3 are set up in proper relation one to the other. These screens are preferably made of transparent material, except possibly screen 3. These screens may have a scene painted thereon, for instance on the screen 1, a tree 4 in the foreground is illustrated and in the background pyramids 5. Such paints are preferably opaque but in some cases may be translucent or semi-transparent. The remaining portions of the screen will preferably be left transparent. The screen 2 may likewise be painted, having as indicated a hut 6. The screen 3 is indicated as having clouds 7. These would preferably be painted with translucent paint so that the colors will shine through if desired.

A natural object is indicated by the bush 8 which as hereafter described it is desired to eliminate and an artificial object such as the cactus 9 is introduced between the screens 1 and 2. Behind the screen 2, a natural pond 10 is indicated and a tank 10', which as hereafter indicated it is desired to eliminate. A background indicated by natural hills 11 is behind the whole setting. The actors are designated by a single actor 12 between screens 1 and 2; the two actors 13 behind screen 2 and the actor 14 in the canoe on the pond. The lighting effects are indicated by front lights 15, 16 and 17 and by back lights 18, 19 and 20, these lights being positioned to illuminate the scenes painted on the screens. Adjustable ground lights 21 and 22 indicate front lights and 23 indicates a back light which may be thrown on the back of the screen. Color lights are indicated by the stands 24, 25 and 26, each of which may have a series of lamps of different colors to give the effect desired by switching on or off any of the more actinic colors.

The camera 27 is indicated as being positioned in the proper relation to the screens, the objects and to the actors. After focusing the camera, light filters are coated on the screens; for instance, a red filter formed by a red dye stain is indicated by the numeral 28 on the screen 1 and is designed to reduce the photographic effect of the bush 8 which is incongruous to the picture. A second filter 29 indicated as blue is shown on the screen 1 and is designed to enhance the photographic color of the actor 12. A third filter 30 is indicated on the screen 2, being shown to indicate yellow and may be utilized to affect the color value of the actors 13 and their immediate surroundings. Another color filter 31 is indicated on screen 2, being shown as of a red color designed to reduce the photographic effect of the tank 10' which is incongruous to the picture. An artificial sketch 32 is drawn across this stain to indicate the shore line of the pond 10 where it is naturally blocked by the tank.

In applying the color filters 28, 29, 30 and 31, care must be exercised that these are not too deep in color, as a very thin film of filter stain on a transparent sheet of glass materially affects the photographic value of objects or scenes photographed therethrough. Moreover, in applying these filter stains they should be gradually thinned out at the edge so that there is no distinct delineation of the ending of the stain and the beginning of the clear glass. In other words, the filter stain should be applied so that there is a gradual change from the transparency of the glass screen to the full color value desired; but this change should be so gradual that the stain does not photograph on the glass as a distinct color unit. Also, the lighting should be of such character that there is substantially no reflected light from the screen back to the camera where the filter stains are used. If there is no light from these stains being reflected back to the camera they may be made of considerably deeper colors and still give no photographic effect themselves on the film, but merely affect the objects viewed through such filters.

In utilizing a set as above described, with the partially painted transparent screens, an action may take place and an illumination utilized to give a natural effect. The painted scenes, the setting and the actors may be illuminated by front illumination to give an appearance of a front light shining on them or they may be illuminated by a back light to give a silhouette effect, or the painted scenery alone may be illuminated by the back lights and the actors by the front lights or vice versa.

If photographs in black and white are being taken, the photographic effect depends materially on the colors of the different parts of the set, scene, or actors. Some of the natural colors may be such that they will photograph suitably, and others photographing insufficiently. Color photography is affected to a greater extent by the colors of the different parts of the scene, set, or actors, than in black and white photography.

Moreover there may be parts of a set or particular actors in regard to which it is desired to change the color effect or to enhance the photographic imprint by changing the color to one which will photograph better than that of such objects or actors under the general illumination. In such case a color may be focused on such objects or actors in order to change the color effect. For instance a blue color, which may be designated as more actinic than the natural illumination, may be focused on the actor 12 which will change the color value of the photograph of such actor from that which would be given by the general illumination.

In Fig. 1 the whole assembly is shown as being located out of doors and being taken by daylight in order to show the hills in the distance and with the addition of certain artificial lights to be focused on part of the scenes, sets or the actors. It is to be understood that these artificial lights may be turned out, or dimmed, or controlled in any suitable manner, to give the effect desired when viewed from the camera.

The color value of certain parts of the set, scene, or act, may also be changed or affected by staining part of the screen with a filter strain. For instance, if a blue stain, such as 29, is utilized and the actor 12 is photographed there-through, the lights reflected from the actor will all be absorbed except the blue and thereby the photographic color value of such actor will be that of a blue color. With this light filter there may be a blue light focused on the actor which will enhance the photographic color value. The yellow filter stain 30 will also have a color effect on objects photographed through same on the film.

There may be certain objects which have inharmonious colors, or are too conspicuous, or perhaps incongruous, in which the color value may be affected by illuminating the same with a color less actinic than the general illumination, such as by red illumination. Thus the bush 8, which may be too prominent or may have an undesirable color, may be illuminated by a red light and thus affect the color value of such object. Similarly the tank 10' may be also illuminated by a red light to change its color value and possibly reduce the photographic effect.

Another manner of reducing the photographic effect of inharmonious or incongruous objects is by using a color filter stain on the screens, for instance, the red stain 28 may be used to reduce or eliminate the photographic effect of the bush 8 which is focused through such filter, as through this portion of the screen only the red light would be transmitted and hence photographed poorly or not at all. The same use may be made of the red stain 32 to affect photographic color value of the incongruous tank 10'. If desired, the red lights may also be used with the red color filters, the red lights changing the tone of the objects to that of a red and the color filters allowing transmission only of red lights which, as is well known, photograph poorly.

The clouds of screen No. 3 may be illuminated by back-lighting to give a dark or stormy effect or by front-lighting to show bright colors in the picture. These clouds, as above mentioned, may be painted with translucent paint if desired.

Moreover, it will be seen that the transparent scenes allow the use of light filter stains to be placed as desired to control the photographic effect of the objects seen therethrough.

In my invention as set forth in Fig. 4, a front screen 40 has a scene painted thereon, indicated by the castle 41. The screen above the contour of the castle is preferably transparent. An intermediate transparent or translucent screen 42 is shown with a painting 43 thereon, indicating the sun or the moon according to the light effects. A back screen 44 is shown with clouds 45 painted thereon. This screen is also movable, being mounted on the track 46.

The actors 47 stand on a staging 48 which is of a sufficient elevation to indicate the actors through the camera 49 as being on top of the battlements of the castle.

The front lighting is indicated by the set lamps 50 and 51, the back lighting by the lamps 52 and 53; various shiftable lights are indicated by the front lights 54 and 55 and by the back lights 56 and 57.

In operating with the scene and setting as above depicted, the front lights may be utilized to illuminate the picture painted on the transparent screen 40, giving a daylight effect; the back lights 53 illuminating the moving clouds and illuminating the sun indicated by 43 which will be painted in translucent paints. The actors may be illuminated by either front or back lights as it is desired that they appear, in silhouette or in a front view. A scene so photographed is indicated in Fig. 5.

If it is desired to give a night or silhouette effect, the painting and screen 40 will be illuminated by the back lights, bringing out the castle in silhouette. The actors would also be illuminated by the back light, showing them in silhouette and the element 43 may be utilized to indicate the moon, the back lights showing up the moving clouds.

It will thus be seen that with the setting of Fig. 4, that either daylight or night effects may be readily obtained, having the actors appear either with the daylight effect or in shadow as in silhouette.

It is obvious that my invention as to the method and the different steps thereof and also to the screens and appliances used may be considerably changed in photographing different types of scenes and settings, such changes being in accordance with my invention as set forth in the description, drawings and claims.

In describing my invention I have not differentiated between the photography of so-called black and white pictures and color photography, as this latter is usually effected by colors incorporated with the films or light filters used with the cameras. However, it is manifest that my invention is particularly applicable to color photography, especially in the use of transparent screens and illuminating different parts of the set with colors having different photographic values and also in the use of light filters stained on the screens.

So far in the art of color photography the most satisfactory processes can only depict light and delicate shades and can not give great contrasts. However, with my additional effect of lighting the use of partial light filters may be embodied in the art of color photography to enhance the color distinctions and hence give more realistic pictures.

When it is realized that full panchromatic emulsions are rarely used on films for moving picture negatives, and moreover, that such films are not fully responsive to all colors, it will be realized that by changing the color scheme as by focusing a strong actinic light such as a blue or the like on a moving figure, such as the actor 12 in Fig. 1, that this actor may be emphasized in the picture more prominently than the portions of the scene or other actors not so illuminated.

Moreover, if the incongruous bush which under the ordinary illumination would register photographically, is illuminated by a deep ruby colored light, that the light reflected from the bush to the camera will have very little photographic effect, as red light has but little actinic properties. Therefore such incongruous feature as the bush 8 or the tank 10' by proper illumination may be made inconspicuous from the photograph, or practically blocked out.

The light filter stains may be placed on the large screens with considerable accuracy, as the camera man in focusing his camera can inform his assistant of the particular places on the large screen light passes through from the objects he wishes to enhance by the use of filters, or which he wishes to reduce or eliminate. The assistant can stand at one side of the screen and by means of a long handled brush or the like coat the particular part of the glass screen with the desired light filter.

It will be realized that if a filter of a deep red such as indicated by 28 and 31 is coated on the screen in line with the light from incongruous objects such as the bush 8, and the tank 10', that the photographic effect of such incongruous elements may be reduced in the photograph or by suitable stain eliminated. Also by the use of light filters such as 29 which allow passage of colors having actinic properties, that the photographic effect of objects taken through such filters will be enhanced relative to the other portions of the scene when the lighting of such scene is properly manipulated. These various features require a certain amount of experimentation to secure the best results and cannot be defined absolutely in the specification.

Having described my invention, what I claim is:

1. In the method of motion picture photography, positioning a transparent screen in front of a set and entirely separate from a camera, staining part of the screen with a light filter photographically less actinic than the transparent screen, said stain being positioned to photographically affect certain objects focused there-through in the camera and photographing the set to reduce the photographic color value of the parts of said set behind the filter.

2. In the method of making motion pictures, positioning a transparent screen separate from a camera in a set having general illumination, illuminating an object in the set with a photographically less actinic light than the general illumination, staining part of the screen with a light filter photographically less actinic than the transparent screen in the line of focus of the object so illuminated and photographing said set to affect the photographic color value of the object so illuminated.

3. In the method of making motion pictures, positioning a transparent screen separate from a camera in front of a set, staining part of the screen with a photographically actinic light filter and photographing the set to affect the photographic color value of the objects focused through the light filter.

4. In the method of claim 3, in addition illuminating such objects with a photographically actinic light to enhance the photographic color value of such objects.

5. In the art described, the combination of a set, camera and a transparent screen between the camera and the set, the screen being of large size compared to the lens of the camera and positioned entirely separate from the camera and a semi-transparent light filter stained on part of the screen in the line of focus of part of the set to affect photographically the color value of the picturization of such part of the set in the said set.

6. In the art described as claimed in claim 5, in which the light filter is photographically non-actinic sufficient to reduce the photographic color value of the objects in the said part of the set.

7. In the art described as claimed in claim 5 in which the light filter is photographically actinic to affect the photographic color value of the objects in the said part of the set.

8. In the art described, the combination of a set, a camera, a light filter positioned between the camera and the set, the filter being of large size compared with the lens of the camera and positioned entirely separate from the camera, so that part only of the scene in the line of focus of part of the set passes through the light filter to affect the color value of the picturization of such part of the set differently from that of the set as a whole.

9. The method of making moving pictures, comprising forming a set with a plurality of transparent screens assembled one behind the other, some of said screens having opaque paintings representing foreground and background and representing scenery or articles of settings, the remaining portions of said screens being transparent, positioning artificial settings between and behind some of the screens, effecting animated acts between and behind the screens, illuminating the screens, the sets and the act with colors each actinically suitable to different parts of the screens, sets or acts to affect the photographic color value, illuminating certain parts of the sets or the act with photographically more actinic colors than the general illumination and staining part of a screen in front of such set or act with a photographically actinic light filter stain to enhance the photographic color value of the parts or act so illuminated and photographed through the light filter.

10. The method of making moving pictures, comprising forming a set with a plurality of transparent screens assembled one behind the other, some of said screens having opaque paintings representing foreground and background and representing scenery or articles of settings, the remaining portions of said screens being transparent, positioning artificial settings between and behind some of the screens, effecting animated acts between and behind the screens, illuminating the screens, the sets and the act with colors each actinically suitable to different parts of the screens, sets or acts to affect the photographic color value, illuminating certain objects or acts with a photographically less actinic color than the general illumination and staining part of a screen in front of such object or act with a light filter transmitting a less actinic light than through the unstained screen to change the photographic color value of said object or act.

11. In a motion picture set, a plurality of transparent screens separate from a camera assembled one behind the other, some of said screens having opaque scenery painted thereon and having the remaining portion transparent, a photographically non-actinic light filter stain on part of the transparent screens to reduce the photographic color value of objects focusing through said filter.

12. In a motion picture set, a plurality of transparent screens separate from a camera assembled one behind the other, some of said screens having opaque scenery painted thereon and having the remaining portion transparent, a photographically actinic light filter stain on part of the transparent screens to affect the photographic color value of objects focused through such filter.

13. The method of making motion pictures, comprising assembling a plurality of transparent glass screens positioned entirely separate from a camera, one behind the other, said screens having portions of opaque scenery painted thereon, performing an animated act between some of the screens and photographing the set through one or more of the screens, and in addition moving a translucent scene having back illumination to give a moving effect to a portion of the scenery.

14. The method of making motion pictures comprising assembling a plurality of transparent glass screens positioned entirely separate from a camera one behind the other, said screens having portions of opaque scenery painted thereon, performing an animated act between some of the screens and photographing the set through one or more of the screens, and in addition coating part of one or more of the screens between a camera and an object or objects with a light filter color to affect the photographic color value of an object or objects viewed through such filter.

15. The method of making motion pictures, comprising assembling a plurality of transparent glass screens positioned entirely separate from a camera one behind the other, said screens having portions of opaque scenery painted thereon, performing an animated act between some of the screens and photographing the set through one or more of the screens, in addition staining a part of one or more of the screens with a photographically less actinic light filter color than the general illumination, positioned in relation to a camera and an object or objects to affect the photographic color value of an object or objects photographed through said light filter.

In testimony whereof I have signed my name to this specification.

PIERRE ARTIGUE.